J. Dillingham,
Hand Saw.
N° 34,946.      Patented Apr. 15, 1862.
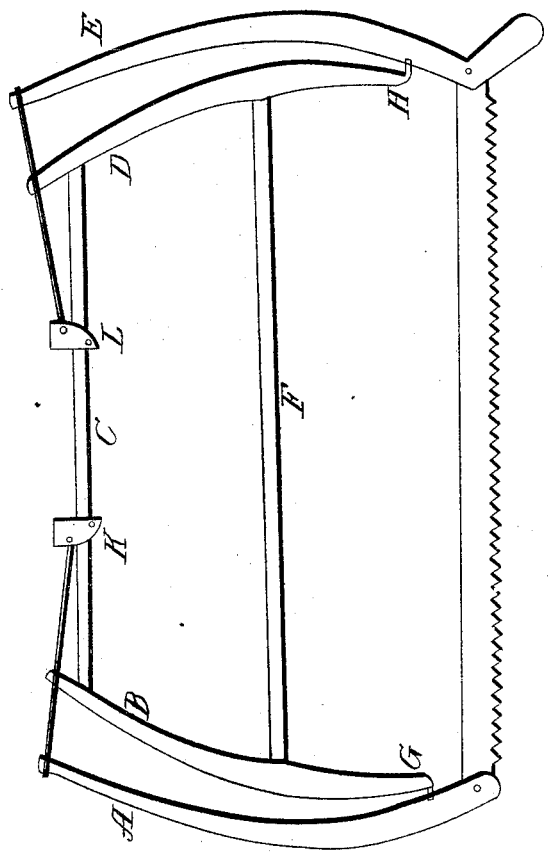
Witnesses:
Job Prince
Jesse Frollett
Inventor:
John Dillingham

UNITED STATES PATENT OFFICE.

JOHN DILLINGHAM, OF TURNER, MAINE.

IMPROVEMENT IN WOOD-SAW FRAMES.

Specification forming part of Letters Patent No. 34,946, dated April 15, 1862.

*To all whom it may concern:*

Be it known that I, JOHN DILLINGHAM, of Turner, in the county of Androscoggin, in the State of Maine, have invented a new and useful Improvement on E. S. Clapp's Method of Framing and Straining Wood-Saws, patented July 1, 1856, said improvement being called Dillingham's Improved Wood-Saw Frame; and I do hereby declare that the following is a full and exact description thereof, reference being had to the accompanying drawing and to the letters of reference marked thereon.

My invention relates to certain improvements in the means of straining the saw; and it consists in the use and combination of an auxiliary frame with sliding adjustable dogs or catches, as hereinafter fully described.

That others may understand the manner of constructing and using my improvement, I proceed to describe the same, referring to the accompanying drawing.

In the drawing, A E are the two outer frame-pieces, to which the saw is pivoted in the usual manner.

B D are the auxiliary frame-pieces, connected by the two cross-bars C F. The top cross-bar is provided on its under side with ratchet-teeth, for the purposes hereinafter explained.

The auxiliary or inner frame is provided at G H with metal pivots projecting laterally and fit into recesses of the outer frame-piece A E. Two slotted dogs or catches K L are placed upon the upper cross-piece C. Each of them is connected to the upper end of the frame-pieces A E by a rod or equivalent means, which passes through the projecting ends of the inner frame-pieces B D, as represented in drawing.

To strain the saw, the two outer frame-pieces A E are compressed or sprung toward each other, when by hand the dogs or catches or one of them is slipped toward the center of the cross-piece C, which both of the catches embrace, and these catches take hold of the ratchet-teeth on the under side of the cross-piece C, thus securing the saw in its strained condition.

I do not claim the use of an auxiliary frame-piece or the use of the catches and ratchet-teeth for the purpose of straining wood-saws; but What I do claim, and desire to secure by Letters Patent, is—

The combination and arrangement of the dogs or catches K L with the double saw-frame when constructed and operated in the manner and for the purpose specified.

JOHN DILLINGHAM. [L. S.]

Witnesses:
JOB PRINCE,
JESSE FOLLETT.